(12) United States Patent
Yang

(10) Patent No.: US 6,777,916 B2
(45) Date of Patent: Aug. 17, 2004

(54) MULTISTAGE STORAGE SYSTEM FOR INTERMITTENT OR UNSTABLE VOLTAGES

(76) Inventor: Tai-her Yang, No. 59, Chung Hsing 8 St., Si-Hu Town, Dzan-Hwa (TW)

(*) Notice: Subject to any disclaimer, the term of this patent is extended or adjusted under 35 U.S.C. 154(b) by 0 days.

(21) Appl. No.: 09/991,641

(22) Filed: Nov. 26, 2001

(65) Prior Publication Data

US 2003/0099121 A1 May 29, 2003

(51) Int. Cl.[7] .................................................. H02J 7/04
(52) U.S. Cl. ........................................................ 320/146
(58) Field of Search ................................ 320/137, 140, 320/146, 160

(56) References Cited

U.S. PATENT DOCUMENTS

| | | | | |
|---|---|---|---|---|
| 5,610,499 A | * | 3/1997 | Rogers | 322/25 |
| 5,703,468 A | * | 12/1997 | Petrillo | 320/101 |
| 5,764,028 A | * | 6/1998 | Freiman et al. | 320/106 |
| 6,160,377 A | * | 12/2000 | Fujii | 320/117 |
| 6,160,389 A | * | 12/2000 | Watts | 323/282 |

* cited by examiner

Primary Examiner—Adolf Berhane
(74) Attorney, Agent, or Firm—Bacon & Thomas, PLLC

(57) ABSTRACT

A multi-stage energy storage system includes two different storage devices having different voltage outputs, the lower voltage storage device being charged first to enable expedited supply of low voltage.

15 Claims, 5 Drawing Sheets

MULTISTAGE STORAGE SYSTEM FOR INTERMITTENT OR UNSTABLE VOLTAGES

BACKGROUND OF THE INVENTION a. Field of the Invention

The present invention is relates to a random input multistage storage system for storing voltages from intermittent or unstable power sources as well as from a power grid, and more particularly, to a circuit system that utilizes a voltage difference between two or more than two stages comprised of two or more than two types of storage device, to store DC-converted city power, or charging energy randomly inputted from unstable sources such as a solar cell or a windmill generator.

b. Description of the Prior Art

The prior art involves the input of DC power which has been converted from AC using a contact type conduction structure for random coupling, or using electric energy outputted from a solar cell or a windmill generator or other unstable sources, such as tide generation or vibration generation to drive a load capable of random operation. However, during operation, the power supply is frequently disconnected due to intermittent operation of the contact type conduction interface, or the effect of ambient factors in case of solar or wind energy, or instability in tide or vibration energy. To cope with these defects, batteries are added to ensure a consistent supply of power according to the following options:

(1) A primary battery with positive polarity is added in series with an isolation diode before being connected in parallel with the output side of a random input source (such as in the application of a calculator with a solar cell);
(2) A secondary (dis)chargeable battery is connected in parallel with the output side of a random input source;
(3) A super capacitance is connected in parallel with the output side of a random input source; or
(4) A voltage stabilization capacitance is connected in parallel with the output side of a random input source;

However these options are further found to have the following defects:

Option (1) is not very convenient since in the connection of the primary battery in parallel with the output side of the random input source, any insufficiency of electric energy in the primary battery requires immediate replacement.

For options (2) and (3), a longer standby time for recharging is required to receive DC voltage converted from the city power, or the output of a solar cell or windmill through the contact type of conduction structure to allow for the rise up to normal working voltage, if the secondary (dis) chargeable battery or the super capacitance functioning as the battery is at low capacity. If a solar cell with higher capacity is used to simultaneously supply charging electric energy and loading electric energy, the installation of such a solar cell is comparatively expensive, requires a larger area and and therefore is generally impractical and not economic. Furthermore, it is far more difficult to control the immediate charging by relying on windmill generation.

Option (4) requires connection of a stabilizing capacitance in parallel and, if the capacity gets too small, fails to provide a high density output or if the capacity becomes too high, similar defects to those found with option (3) appear.

SUMMARY OF THE INVENTION

The primary purpose of the present invention is to provide a random input multistage storage system for unstable or intermittent voltages. To achieve this purpose, a circuit system controls storage based on a voltage difference between two or more than two stages comprised of two or more than two types of storage device, for storing DC-converted city power, or charging energy randomly inputted from an unstable source such as a solar cell or a windmill generator to correct those defects observed with the prior art.

DETAILED DESCRIPTION OF THE PREFERRED EMBODIMENTS

Figure 1:
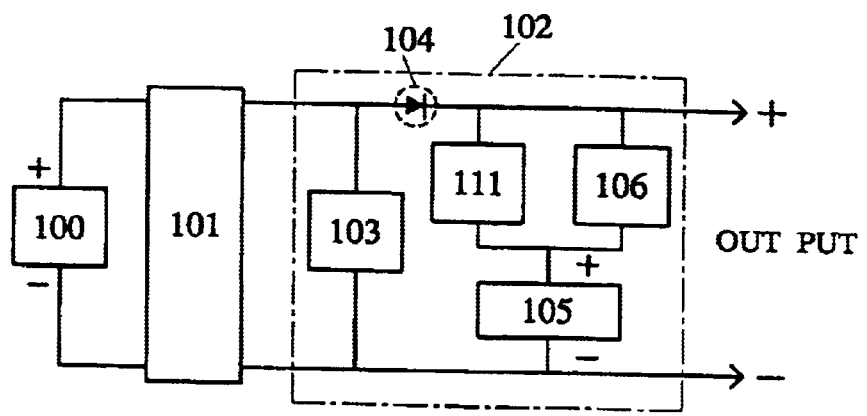
FIG. 1 is a block chart showing a circuit of the present invention.

Referring to FIG. 1, a random input multistage storage system for unstable or intermittent voltages includes:

- a DC source 100 comprised of a contact type conduction device for random coupling to a rectified city power source, or to a DC source from a solar cell, windmill generation, tide or vibration energy or any other unstable DC or AC source, or a DC source converted from an AC source;
- an optional circuit 101 to regulate and limit inputted electric energy: comprised of a diode or other one-way current transmission device or circuit, e.g., an electro-mechanical device, a controllable power chip, a gate current, or other one-way current transmission solid state circuit device or circuit, to regulate and control voltage and amperage outputted from the DC source to a storage unit 102, and to ensure that the electric energy can only be outputted from the DC source 100 to each storage unit and output terminal while input to the DC source 100 is prevented; and
- a storage unit 102 containing a first storage device 103 comprised of a capacitance, super capacitance or secondary battery, to be connected in parallel with the DC source 100 and output terminal, and the output terminal of the first storage device 103 may be further connected in series with an isolation diode 104 in the positive direction as required by the circuit; a second storage device 105 provided with a capacitance or super capacitance, or a primary battery or secondary battery, connected first in series with a one-way electric energy output limiting circuit 106, then in parallel with the power source and output terminal; a circuit 108 to regulate and control outputted amperage provided with the one-way electric energy output limiting circuit 106 and comprised of a diode 107 or other one-way current transmission device or circuit, e.g., an electro-mechanical device or controllable power chip or gate current, or other one-way current transmission solid state circuit device or circuit, so to ensure that the secondary battery device can only output electric energy to the source side and load side connected in parallel while electric energy input the secondary battery device is prevented; and an optional charging operation and control circuit 111 comprised of a positively-biased diode 109, a zener diode 110, or an electromechanical device or solid state circuit device that is connected in parallel with both terminals of the one-way electric energy output limiting circuit 106, to operate and control setting up the voltage for the DC source to commence charging the second storage device 105, or to further limit its charging current and to convert its charging saturation to the status of maintaining charging or circuit breaking when the second storage 105 is comprised of a capacitance, super capacitance, or (dis)chargeable secondary battery or other chargeable storage device.

Figure 2:
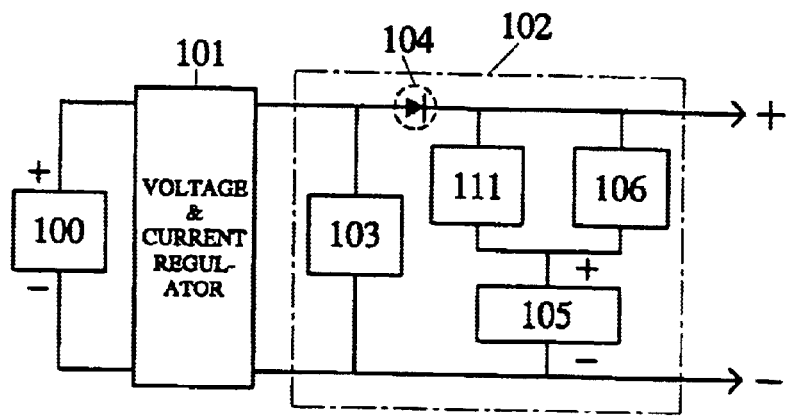
FIG. 2 is a view showing a circuit to regulate and limit inputted electric energy in FIG. 1, which is comprised of a voltage and amperage regulation circuit.

FIG. 2 is a view showing inclusion of a voltage and amperage regulation circuit to regulate and limit input electric energy in the circuit of FIG. 1. The optional circuit for regulating voltage and amperage may be comprised of an electromechanical or solid state electronic device connected between the DC source 100 and the storage unit 102 to operate and control the voltage and current outputted from the DC source 100 for supplying limited or constant voltage or current to be outputted to the first storage device 103 of the storage unit 102. If an optional isolation diode 104 is connected in series, such current and voltage may be further outputted to the next stage of a storage circuit connected in parallel and comprised of the second storage device 105 and the one-way electric energy output limit circuit 106 for further output.

Figure 3:
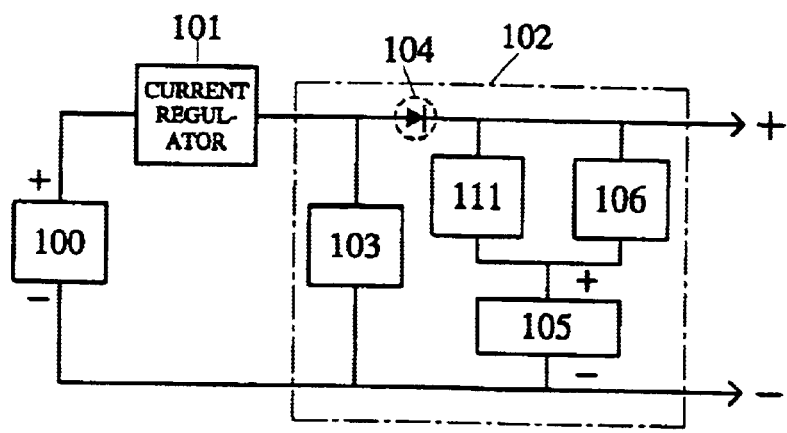
FIG. 3 is a view showing a circuit to regulate and limit inputted electric energy in FIG. 1, which is comprised of an amperage regulation circuit.

FIG. 3 is a view showing a circuit to regulate and limit input electric energy in FIG. 1 is comprised of an amperage regulation circuit. The optional current regulation circuit is comprised of an electro-mechanical device or solid state electronic device provided between the DC source 100 and the first storage device 103 of the storage unit 102, to execute operation and control to limit or supply constant current to the output from the DC source 100 before being further outputted to the first storage device 103 of the storage unit 102. If the optional isolation diode 104 is connected in series, the output from the DC source 100 may be further outputted to the next storage circuit connected in parallel and comprised of the second storage device 105, the one-way electric energy output limit circuit 106, and a charging operation and control circuit 111 for further output.

Figure 4:
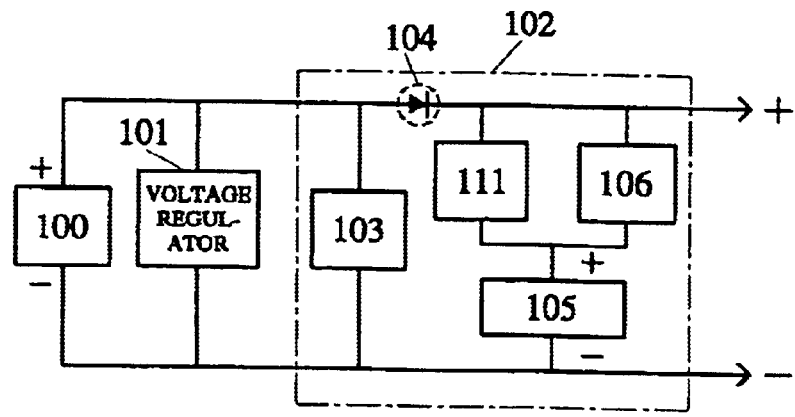
FIG. 4 is a view showing a circuit to regulate and limit inputted electric energy in FIG. 1, which is comprised of a voltage regulation circuit.

FIG. 4 is a view showing a circuit to regulate and limit input electric energy in FIG. 1 comprised of a voltage regulation circuit. The optional voltage regulation circuit is comprised of an electro-mechanical device or solid state electronic device provided between the DC source 100 and the first storage device 103 of the storage unit 102, to execute operation and control of limit or constant voltage on the output from the DC source 100 before being further outputted to the first storage device 103 of the storage unit 102 and, if the optional isolation diode 104 is connected in series, further outputted to the next storage circuit connected in parallel and comprised of the second storage device 105, the one-way electric energy output limit circuit 106, and a charging operation and control circuit 111 for further output.

Figure 5:
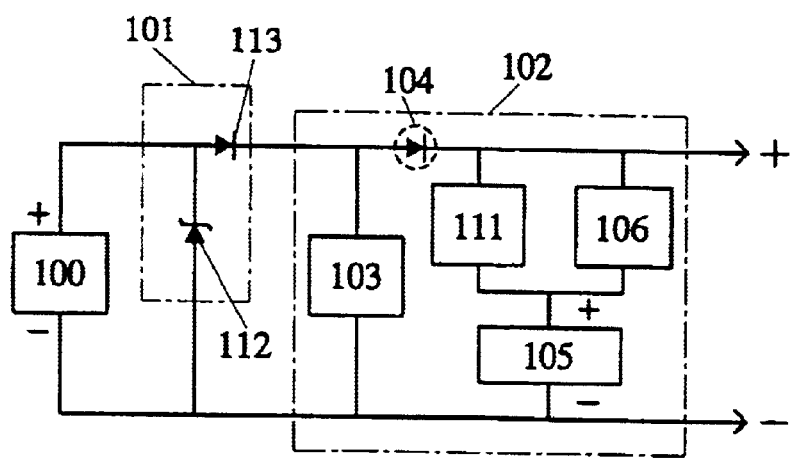
FIG. 5 is a view showing a circuit to regulate and limit inputted electric energy, which is comprised of a DC source taken from FIG. 1 connected first in parallel with a zener diode before being connected in series with an isolation diode in the positive direction of the current.

FIG. 5 is a view showing a circuit to regulate and limit inputted electric energy comprised of a DC source taken from FIG. 1 and connected first in parallel with a zener diode before being connected in series with an isolation diode in the positive direction of the current; wherein a zener diode 112 is directly connected in parallel with both terminals of the DC source 100 (a drop resistance may be connected in series before the connection of the zener diode 112 if required) Then, an isolation diode 113 is connected in series in the positive direction of the current before being outputted to the first storage device 103 of the storage unit 102, and if the optional isolation-diode 104 is connected in series, further outputted to the next storage circuit connected in parallel and comprised of the second storage device 105, the one-way electric energy output limit circuit 106, and a charging operation and control circuit 111 for further output.

Figure 6:
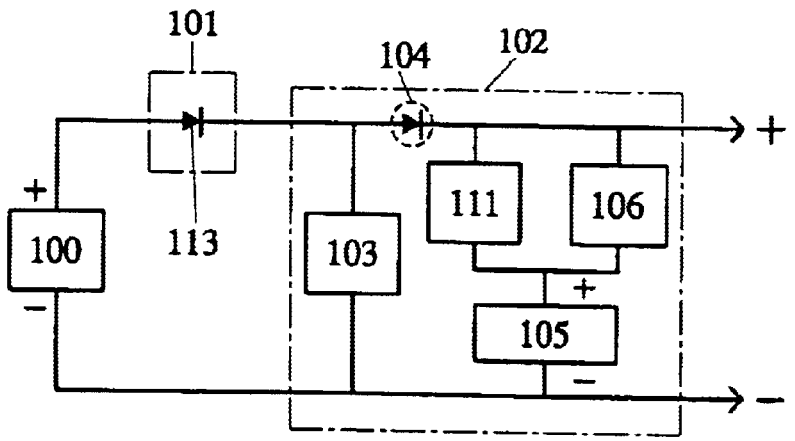
FIG. 6 is a view showing a circuit to regulate and limit inputted electric energy, which is comprised of a DC source taken from FIG. 1 connected in series with an isolation diode in the positive direction of the current.

FIG. 6 is a view showing a circuit to regulate and limit inputted electric energy comprised of a DC source taken from FIG. 1 connected in series with an isolation diode in the positive direction of the current. The isolation diode 113 is connected in series in the positive direction of the current with the DC source 100, then outputted to the first storage device 103 of the storage unit 102 and, if the optional isolation diode 104 is connected in series, further outputted to the next storage circuit connected in parallel and comprised of the second storage device 105, the one-way electric energy output limit circuit 106, and a charging operation and control circuit ill for further output.

Figure 7:
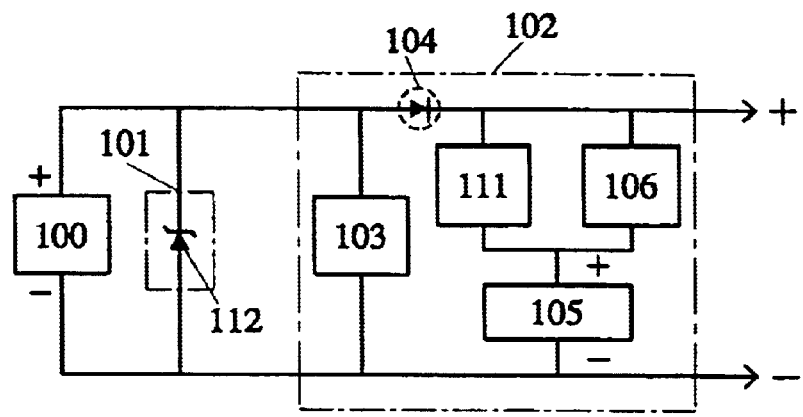
FIG. 7 is a view showing a circuit to regulate and limit electric energy, which is comprised of a DC source taken from FIG. 1 having its both terminals connected in parallel with an isolation diode.

FIG. 7 is a view showing a circuit to regulate and limit inputted electric energy comprised of a DC source taken from FIG. 1 having both terminals connected in parallel with an isolation diode. The zener diode 112 is directly connected in parallel with both terminals of the DC source 100 (a drop resistance may be connected in series before the 20 connection of the zener diode 112 if required) then outputted to the first storage device 103 of the storage unit 102 and, if the optional isolation diode 104 is connected in series, further outputted to the next storage circuit connected in parallel and comprised of the second storage device 105, the one-way electric energy output limit circuit 106, and a charging operation and control circuit 111 for further output.

Figure 8:
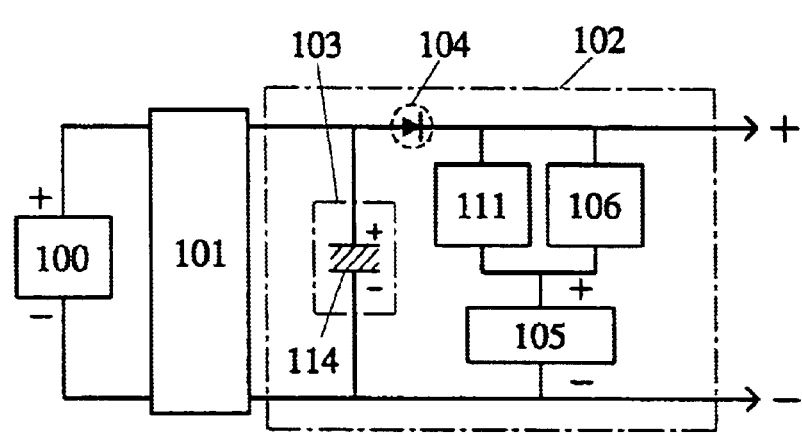
FIG. 8 is a view showing a circuit that a primary battery taken from FIG. 1, which is comprised of a capacity or a super capacity.

FIG. 8 is a view showing a circuit in which a primary battery taken from FIG. 1 is comprised of a capacitance or super-capacitance 114 that provides a storage function for the first storage device 103.

Figure 9:
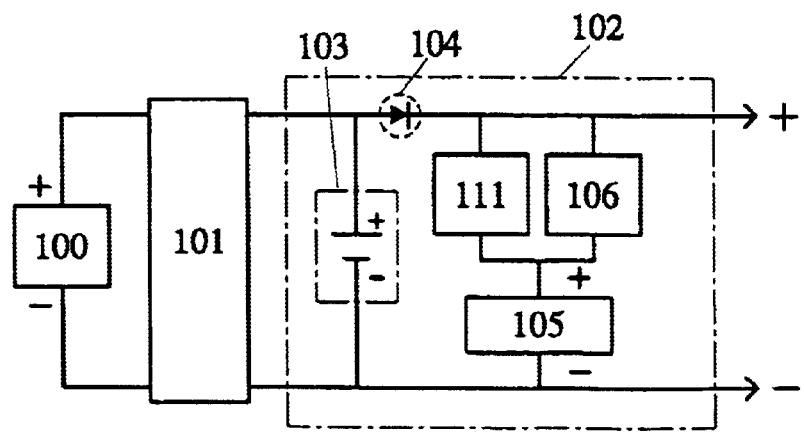
FIG. 9 is a view showing a circuit that a primary battery taken from FIG. 1, which is comprised of a (dis) chargeable secondary battery.

FIG. 9 is a view showing a circuit in which a primary battery taken from FIG. 1 is comprised of a (dis)chargeable secondary battery that provides storage function for the first storage device 103.

Figure 10:
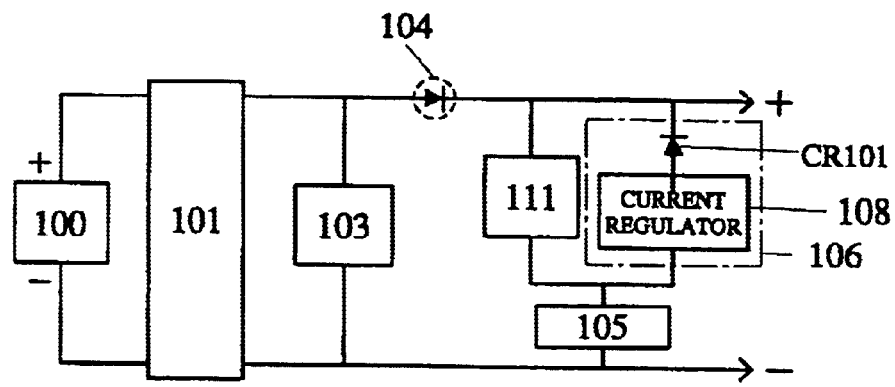
FIG. 10 is a view showing a circuit corresponding to the circuit of FIG. 1, in which a diode is connected in series with a circuit 108 so that its outputted current can be regulated and controlled.

FIG. 10 is a view showing a circuit taken from FIG. 1, in which a diode is connected in series with a circuit 108 for controlling an regulating an output current, and in which diode 107 is connected in series with the circuit 108 to regulate and control the outputted current, before being connected in parallel with the charging operation and control circuit 111 in the same direction of the current, and further connected in series with the second storage device 105 for the charging operation and control circuit 111 to control the charging current of the second storage device 105, and for the circuit 108 and the diode 107 to regulate and control its output current.

Figure 11:
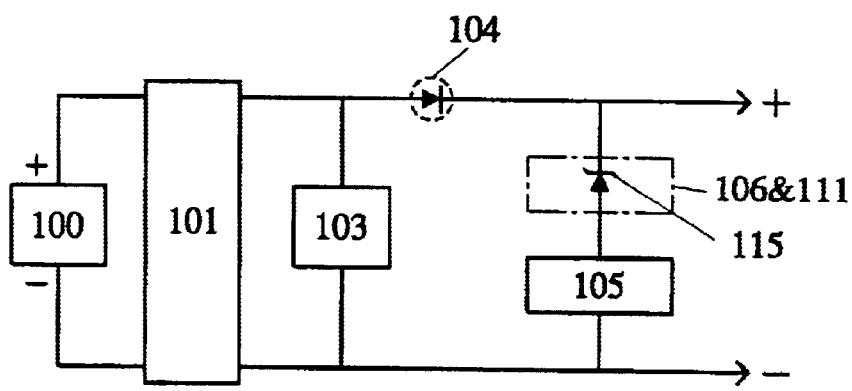
FIG. 11 is a view showing a circuit taken from FIG. 1 iand comprised of a zener diode and a charging operation and control circuit, and a circuit to limit one-way outputted electric energy.

FIG. 11 is a view showing that the circuit taken from FIG. 1 is comprised of a zener diode and contains a charging operation and control circuit, and a circuit to limit one-way outputted electric energy; wherein the circuit is comprised of the zener diode 115 which effectively performs the functions of the charging operation and control circuit 111 and one-way electric energy output limit circuit 106;. The zener voltage function of the zener diode 115 is used to provide the function of the charging operation and control circuit to limit the voltage, and an output route is created by the diode effect in a reverse direction of the zener diode 115.

Figure 12:
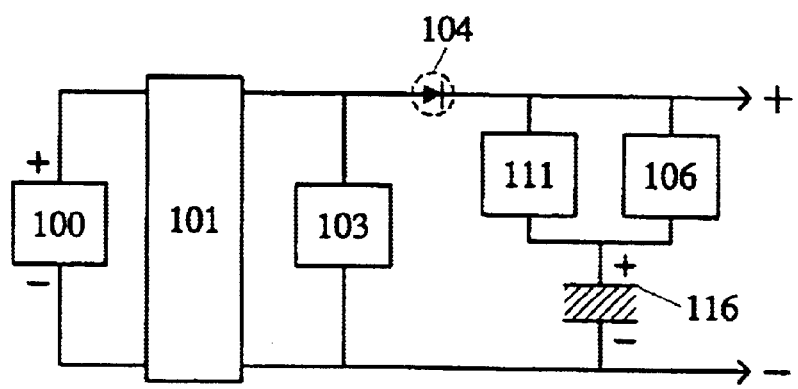
FIG. 12 is a view showing a circuit taken from FIG. 1, in which a secondary battery is comprised of a capacitance or super capacitance.
Figure 13:
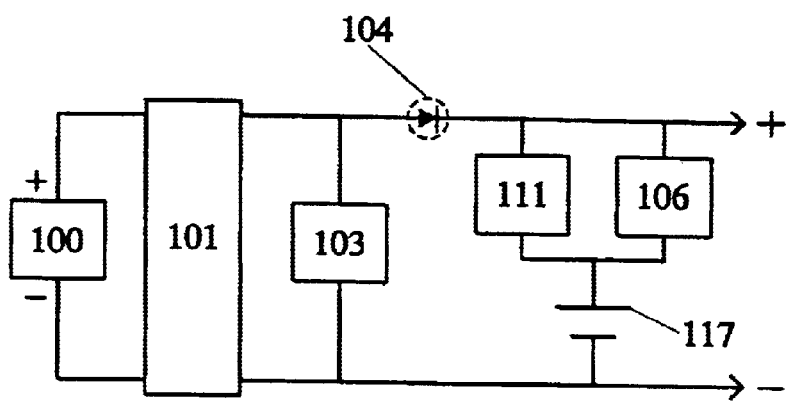
FIG. 13 is a view showing a circuit taken from FIG. 1, in which a secondary battery is comprised of a (dis) chargeable secondary battery.

FIG. 12 is a view showing that in the circuit taken from FIG. 1, the second storage device 105 is comprised of the capacitance or super capacitance 116. FIG. 13 is a view showing that in the circuit taken from FIG. 1, the second storage device 105 is comprised of any type of (dis)chargeable secondary battery 117.

Figure 14:
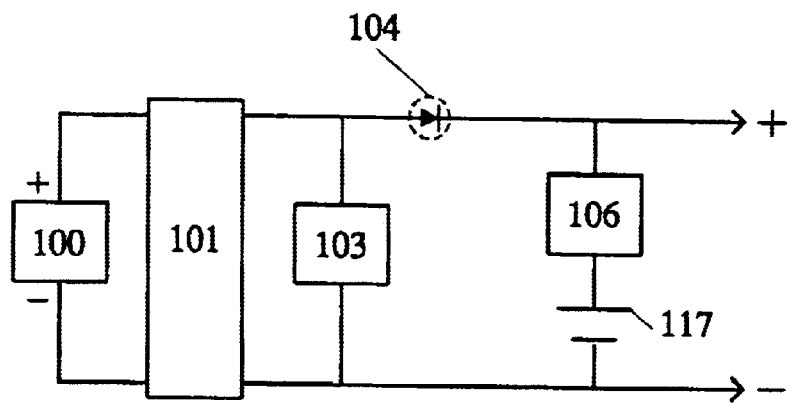
FIG. 14 is a view a circuit taken from FIG. 1, in which a circuit to operate and control charging is not provided; instead, a secondary battery is comprised of a primary or a (dis)chargeable secondary battery or any other (dis) chargeable storage device.

FIG. 14 is a view showing that in the circuit taken from FIG. 1, a circuit to operate and control charging is not provided. Instead, a secondary storage device 105 is comprised of a primary or (dis)chargeable secondary battery or any other (dis)chargeable storage device.

Figure 15:
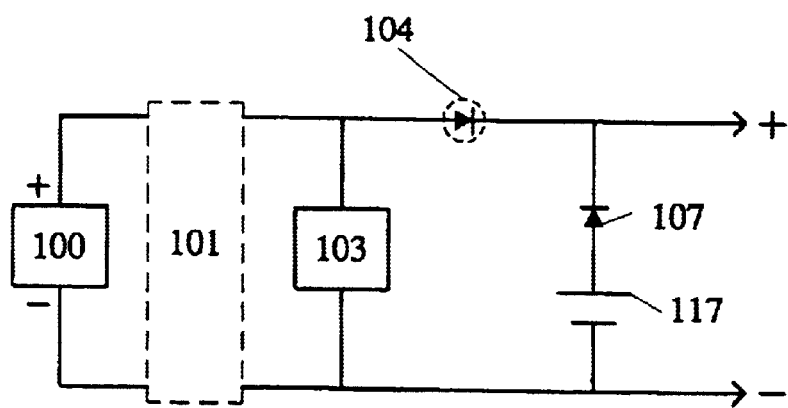
FIG. 15 is a view showing a circuit taken from FIG. 1, in which a circuit to operation and control charging is not provided and a circuit to regulate and limit inputted electric energy may be omitted; instead, a diode is used as a circuit to limit the one-way outputted electric energy, and a secondary battery is comprised of a primary battery or a (dis)chargeable secondary battery or any other (dis)chargeable storage device.

FIG. 15 is a view showing that in the circuit taken from FIG. 1, a circuit to control charging is not provided and a circuit to regulate and limit inputted electric energy may be omitted. Instead, a diode is used as a circuit to limit the one-way outputted electric energy, and the function of the one-way electric energy output limit circuit 106 is provided by the diode 107 and the second storage device 105 comprised of a primary or (dis)chargeable secondary battery or any other (dis)chargeable storage device.

All the preferred embodiments of the random input multistage storage system of the present invention are cost efficient and compact when compared to the prior art. Given a solar cell with its output voltage 3 v, amperage of 5 ma, and a working current of 400 ma for the pulse load of the power controlled device, the solar cell is not capable of directly driving the load and an auxiliary storage device must be added. If the auxiliary storage device has a smaller capacity, it means frequent recharging is required for each round or a few rounds of operation and control. Another flaw is that during intermittent operation a longer time of standby is available for recharging, but the electric energy to be recharged is very limited due to earlier saturation for the smaller capacity. However, if a super capacitance or a secondary battery with larger capacity is used, the defect in its operation is that a longer time will be required for the recharging when the voltage of the battery is low upon start-up.

Should the random input multistage storage system of the present invention be applied in random coupling to a structure provided with a contact type conduction structure, or an intermittent power control device driven by a solar cell such as a calculator, remote control, mouse, keyboard or any other cordless power controlled peripherals, the present invention offers the following improvements:

whereas the system of the present invention is provided with a first storage device and a second storage device and the latter is comprised of a super capacitor or a secondary charging battery of larger capacity, immediate operation upon start-up is possible in the presence of sufficient voltage from the second storage device. If such sufficient voltage from the second storage device is not available, the first storage device with the smaller capacity has the top priority to be charged by the solar cell to expedite the start -up operation while disregarding how low the voltage is from the first storage device. Under the same conditions, a longer stand-by upon start-up is required in the conventional circuit for lacking in a random input multistage storage system, and the operator has to wait until its single high capacity storage device is charged to reach the working voltage;

during the longer period necessary to receive the optical energy from a solar cell, the first storage device with lower storage capacity is first charged up to the preset voltage, then the second storage device is automatically and immediately charged for storage of more electric energy. Furthermore, as may be required by the operation, the random input multistage storage system allows the following options for its first storage device 103, second storage device 105, one-way electric energy output limit circuit 106 and charging operation and control circuit 111:

the relationship of storage capacity among the storage devices is as follows: the storage capacity of the first storage device 103<the storage capacity of the second storage device 105<the storage capacity of the third storage device< . . . and so on to constitute a multistage DC supply system for unstable power sources;

with the exception of the first storage device, the one-way electric energy output limit circuit 106 and the charging operation and control circuit 111 both have to be added in series with the second storage device and any storage device of a subsequent stage;

the one-way electric energy output limit circuit 106 and the charging operation and control circuit 111 are connected in parallel, then respectively connected in series with the second storage device 105 and the third storage device or any subsequent storage device; so that after the first storage device 103 has been charged to its preset voltage, the charging is immediately and automatically provided to the second storage device 105; and when the second storage device 105 is charged up to its preset voltage, the charging is immediately and automatically provided to the third storage device, and so on to constitute a random input multistage storage system;

a charging source to first charge the first storage device 103, then the second storage device 105, and so on to constitute the random input multistage storage system; and the one-way electric energy output limit circuit 106 and the charging operation and control circuit 111 are connected in parallel, then respectively connected in series with the second storage device 105 and the third storage device or any subsequent storage device so that the first storage device 103, the second storage device or any additional storage device of a subsequent stage may jointly supply power to the load.

All the preferred embodiments of the present invention and their application disclosed above are for the description of their working principles and shall not be deemed as conclusive to limit any other combination which maybe selected by following those principles in practical applications.

What is claimed is:

1. A multi-stage storage system for intermittent or unstable voltages, comprising:
   a DC power supply,
   a first storage device connected to receive DC charging voltages from the DC power supply;
   at least one second storage device also connected to receive DC charging voltages from the DC power supply;
   wherein the first storage device has a lower capacity than the second storage device; and
   wherein the second storage device is not charged until after the lower-capacity first storage device has been charged to a preset voltage and is available for low voltage output.

2. A multi-stage storage system as claimed in claim 1, further comprising a one-way energy limit circuit and a charging control circuit each connected in series with the second storage device for regulating supply of charging voltages to the second storage device.

3. A multi-stage storage system as claimed in claim 1, further comprising an isolation diode connected in series between the first and second storage devices.

4. A multi-stage storage system as claimed in claim 1, further comprising a voltage and current regulator connected between the DC power source and the first storage device.

5. A multi-stage storage system as claimed in claim 1, further comprising a current regulator connected between the DC power source and the first storage device.

6. A multi-stage storage system as claimed in claim 1, further comprising a voltage regulator connected between the DC power source and the first storage device.

7. A multi-stage storage system as claimed in claim 1, further comprising a zener diode connected in parallel between the DC power source and the first storage device.

8. A multi-stage storage system as claimed in claim 1, further comprising an isolation diode connected in series between the DC power source and the first storage device.

9. A multi-stage storage system as claimed in claim 1, wherein the first storage device is a secondary battery.

10. A multi-stage storage system as claimed in claim 1, wherein the first storage device is a capacitor.

11. A multi-stage storage system as claimed in claim 1, wherein the second storage device is a secondary battery.

12. A multi-stage storage system as claimed in claim 1, wherein the second storage device is a capacitor.

13. A multi-stage storage system as claimed in claim 1, wherein the second storage device is a primary battery.

14. A multi-stage storage system as claimed in claim 1, further comprising a zener diode connected in series between the DC power source and the second storage device.

15. A multi-stage storage system as claimed in claim 1, further comprising a current-regulating diode connected in series between the DC power source and the second storage device.

* * * * *